United States Patent [19]

Würmli

[11] Patent Number: 4,615,169
[45] Date of Patent: Oct. 7, 1986

[54] APPARATUS FOR REMOVING INDIVIDUAL TEXTILE BOBBIN TUBES FROM A RESERVOIR INCLUDING BOBBIN TUBE JAM BREAK-UP MECHANISM

[75] Inventor: Arthur Würmli, Winterthur, Switzerland

[73] Assignee: Rieter Machine Works Limited, Winterthur, Switzerland

[21] Appl. No.: 823,107

[22] Filed: Jan. 27, 1986

[30] Foreign Application Priority Data

Jan. 29, 1985 [CH] Switzerland .................. 380/85

[51] Int. Cl.$^4$ .................... D01H 9/18; D01H 9/10; B65B 35/10; B65H 3/60
[52] U.S. Cl. .................................... 57/270; 57/266; 57/276; 209/927; 221/168; 221/203; 221/277
[58] Field of Search ............... 57/266, 270, 271, 274, 57/276; 242/35.5 R, 35.5 A; 221/168, 203, 277, 157, 158, 173; 209/927

[56] References Cited

U.S. PATENT DOCUMENTS

| | | | |
|---|---|---|---|
| 1,042,922 | 10/1912 | Johnson | 221/168 |
| 1,107,337 | 8/1914 | McFeely | 221/168 |
| 1,142,010 | 6/1915 | Boozer et al. | 57/270 |
| 1,558,398 | 10/1925 | Rose | 221/277 X |
| 3,089,443 | 5/1963 | Asnes | 221/168 X |
| 3,328,948 | 7/1967 | Du Buis et al. | 57/270 |
| 3,398,520 | 8/1968 | Chabot et al. | 57/270 |
| 3,737,072 | 6/1973 | Deitrick | 221/203 |
| 4,307,807 | 12/1981 | Oswald et al. | 209/927 X |

FOREIGN PATENT DOCUMENTS

| | | |
|---|---|---|
| 336958 | 5/1921 | Fed. Rep. of Germany. |
| 1917329 | 10/1970 | Fed. Rep. of Germany. |
| 1760065 | 6/1971 | Fed. Rep. of Germany. |
| 1142830 | 2/1969 | United Kingdom. |

Primary Examiner—John Petrakes
Attorney, Agent, or Firm—Werner W. Kleeman

[57] ABSTRACT

The apparatus is associated with a spinning or twisting machine and removes individual textile bobbin tubes from a reservoir, such as a container which contains such bobbin tubes. The container has in its lower portion a funnel-shaped structure through which the bobbin tubes move downwardly towards an opening. As is known, there is the danger that the bobbin tubes undesirably form "bridges" and thereby the further delivery of such bobbin tubes is interrupted. Such bridge formation is avoided by providing a break-up rod or bar which is arranged substantially horizontally and parallel to the broad sides of the container, in the interior and in the region above an opening of the container. The break-up rod or bar is supported in the longitudinal sides of the container with play on all sides and in a freely rotatable manner. The thickness of the break-up rod or bar and the thickness of the bobbin tubes are of the same order of magnitude. This apparatus has the advantage of surprising simplicity and thus is much less expensive than hitherto known devices.

16 Claims, 2 Drawing Figures

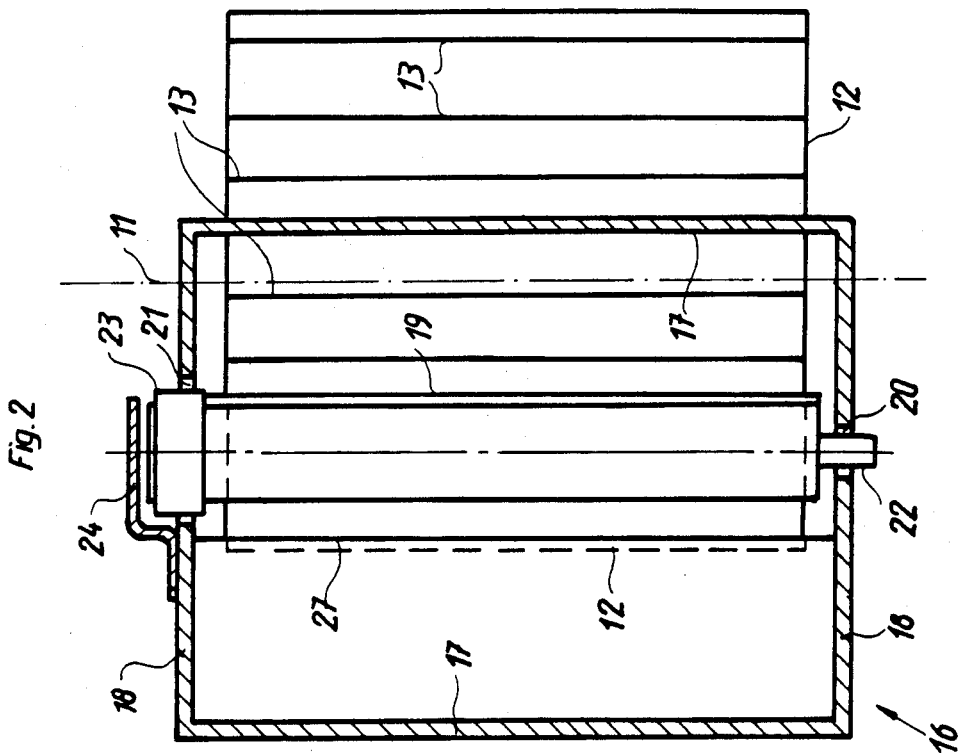

APPARATUS FOR REMOVING INDIVIDUAL TEXTILE BOBBIN TUBES FROM A RESERVOIR INCLUDING BOBBIN TUBE JAM BREAK-UP MECHANISM

BACKGROUND OF THE INVENTION

The present invention relates to a new and improved construction of an apparatus for removing individual textile bobbin tubes from a reservoir, such as a container or the like.

In its more particular aspects, the present invention specifically relates to a new and improved construction of an apparatus for removing individual textile bobbin tubes having a predetermined thickness and a predetermined tube diameter from a reservoir which contains such bobbin tubes in a mutually contacting relationship. Such apparatus is operatively associated with a textile machine, especially a spinning or twisting machine. The reservoir constitutes a container of substantially rectangular cross-section. The container possesses broad sides, two opposite longitudinal sides connected with the broad sides, and a bottom portion which encompasses an exit or discharge opening for the bobbin tubes and at least one bottom surface which extends perpendicular to the longitudinal sides of the container. The bottom surface extends at a downward inclination from one of the broad sides towards the exit or discharge opening in such a manner that the container is narrowed or constricted towards the exit or discharge opening. The apparatus further contains removal means for transporting away individual ones of the bobbin tubes which have passed through the exit or discharge opening of the container.

It is known that in such apparatus the bobbin tubes can jam with one another. During such jamming of the bobbin tubes, so-called "bridges" can be formed in the lower or bottom portion of the container. When this occurs, further delivery of bobbin tubes is interrupted although such bobbin tubes are still present in the container.

In a bobbin tube container as known, for example, from German Patent Publication No. 1,535,069 the bobbin tubes roll along an inclined wall surface of a feed funnel to a filling chute. In order to avoid bridge formation in front of the entry into the filling chute, a break-up or upsetting pusher is provided and driven by an auxiliary motor and a crank for the purpose of loosening the bobbin tubes. Instead of the break-up or upsetting pusher there can also be provided driven pins, or one side wall can be vibratingly supported.

In accordance with the teachings of U.S. Pat. No. 3,328,948, granted July 4, 1967, the bobbin tubes are set in motion by means of bars. The bars are mounted on a rotating wheel which is driven by a suitable drive motor.

In U.S. Pat. No. 3,476,328 there is shown a vibratory plate on which packages are located and which is operated by means of cams.

All these known apparatuses have the disadvantage that there is required a special drive unit and their construction is relatively complicated and, therefore, relatively expensive. In those cases in which the members which upset or loosen the bobbin tubes, perform vibrating movements, there results the further disadvantage that such vibrations may act as shocks due to which spatially stationary members of the apparatus or the associated machine can be loosened.

SUMMARY OF THE INVENTION

Therefore, with the foregoing in mind, it is a primary object of the present invention to provide a new and improved construction of an apparatus for removing individual textile bobbin tubes from a reservoir and which apparatus does not exhibit the aforementioned drawbacks and shortcomings of the prior art constructions.

Now in order to implement these and still further objects of the invention, which will become more readily apparent as the description proceeds, the bobbin tube removal apparatus of the present development is manifested by the features that, there is provided a break-up or upsetting bar which is mounted, for instance, substantially horizontally and substantially parallel to the broad sides of the container and in the interior of the container in a predetermined region above the exit or discharge opening. Specifically, the break-up or upsetting bar is mounted in the longitudinal sides of the container with play on all sides and in a freely rotatable manner. A predetermined thickness of the break-up or upsetting bar and the initially mentioned predetermined tube diameter of the bobbin tubes are of substantially the same order of magnitude.

It is one of the advantages of the inventive apparatus that the formation of bridges by the bobbin tubes is eliminated and an uninterrupted feed of the bobbin tubes is achieved. Additionally, the apparatus according to the present invention is of astounding simplicity. The fact that the aforementioned, improved mode of operation can be achieved with such simple means undoubtedly represents a surprising technological effect.

A complete explanation of the reasons for the mode of operation of the inventive apparatus cannot be provided. However, it is considered to be an essential feature of the inventive apparatus that the break-up or upsetting bar moves along with the bobbin tubes which are in motion, and such movement of the break-up or upsetting bar is laterally, upwardly and downwardly and also rotationally directed. The thus produced movements are transmitted to the bobbin tubes which engage the break-up or upsetting bar, particularly to those bobbin tubes which lie above the break-up or upsetting bar. In this manner, the bridge formation is already prevented in the initial stage. The inhomogeneity, which the break-up or upsetting bar constitutes within the total number of the bobbin tubes, may also play a role. Such inhomogeneity, for example, is based on the fact that the movements of the break-up or upsetting bar, contrary to those of the bobbin tubes, are possible only through small distances.

The bobbin tubes located at the level of the break-up or upsetting bar, furthermore, are divided into two groups by this break-up or upsetting bar. As a result, partial bridges must be formed simultaneously on both sides of the break-up or upsetting bar in order to enable the formation of a bridge which blocks further movement of the bobbin tubes. If a partial bridge is formed only on one side of the break-up or upsetting bar, then, the formation of a second partial bridge on the other side of the break-up or upsetting bar causes a load change at the break-up or upsetting bar such that there occurs a movement of the break-up or upsetting bar and hence a breakdown occurs of the partial bridge first formed on the one side of the break-up or upsetting bar.

The formation of a bridge conjointly with the break-up or upsetting bar thus is most unlikely and practically does not arise.

It appears also that the break-up or upsetting bar acts upon the bobbin tubes in the container such that the bobbin tubes are parallelly aligned to the break-up or upsetting bar. There thus results the additional advantage of the present invention that the provision of the break-up or upsetting bar counteracts the formation of transverse dispositions of the bobbin tubes and thus also faulty operations caused by such transverse dispositions of the bobbin tubes.

Furthermore, it may be significant that the bobbin tubes easily slide at the break-up or upsetting bar, that is the break-up or upsetting bar and the bobbin tubes only slightly adhere to each other.

The use of the invention is especially advantageous with regard to so-called one-way bobbin tubes, since it is well known that such one-way bobbin tubes have a greater tendency to form bridges as compared to rigid multi-way bobbin tubes. The aforementioned inhomogeneity caused by the break-up or upsetting bar is reinforced when the break-up or upsetting bar is not of a round but of a polygonal shape. In such case the movements of the break-up or upsetting bar are transmitted to a particularly large extent. In practice it has been found, however, that the advantages achieved by the invention are also obtained with a round break-up or upsetting bar.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 2 is a section along the line II—II in FIG. 1 when viewed from above.

DETAILED DESCRIPTION OF THE PREFERRED EMBODIMENTS

Figure 1:
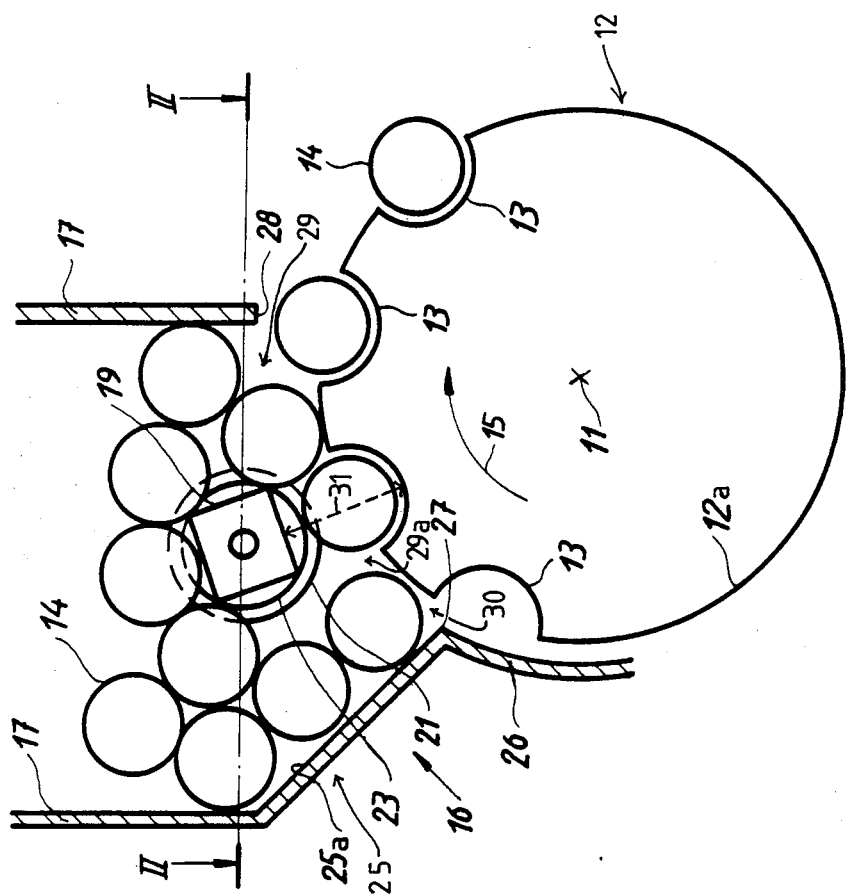
FIG. 1 is a cross-section through an exemplary embodiment of the inventive apparatus.

Describing now the drawings, it is to be understood that to simplify the showing thereof only enough of the structure of the apparatus for removing bobbin tubes from a reservoir, such as a container, has been illustrated therein as is needed to enable one skilled in the art to readily understand the underlying principles and concepts of this invention. Turning specifically now to FIG. 1 of the drawings, the apparatus illustrated therein by way of example and not limitation, will be seen to comprise a drum 12 which is rotatable about an axis 11 and which is provided with pockets 13 for receiving and carrying away individual bobbin tubes 14. The drum 12 is rotatable in the direction of the arrow 15 by conventional and therefore not specifically illustrated drive means. A container 16 constituting a reservoir is located above the drum 12. The container 16 of the exemplary embodiment possesses a substantially rectangular cross-section and is formed by two opposite broad sides 17, two opposite longitudinal sides 18 connecting the two opposite broad sides 17, and a bottom portion 25. The container 16 contains infed bobbin tubes 14 which have a predetermined thickness or tube diameter and which are arranged in a mutually contacting relationship. For reasons of greater clarity of illustration, such bobbin tubes 14 have not been shown in FIG. 2. The bobbin tubes 14 are generally conically shaped, however, are disposed substantially parallel to each other and to the broad sides 17 of the container 16.

In the illustrated embodiment, the inventive apparatus is operatively associated with a not particularly illustrated textile machine of known construction, like, for example, a spinning or twisting machine.

A break-up or upsetting bar 19 preferably extends substantially horizontally and substantially parallel to the broad sides 17 through the interior of the container 16 between and preferably substantially perpendicular to the longitudinal sides 18 of the container 16. The break-up or upsetting bar 19 has a predetermined thickness which preferably is approximately of the same order of magnitude as the predetermined thickness of the bobbin tubes 14.

Bearings 20 and 21 are provided in related ones of the two opposite longitudinal sides 18 of the container 16 for mounting the break-up or upsetting bar 19 in such longitudinal sides 18. Two different types of bearings are illustrated in FIG. 2. At one of its ends, the break-up or upsetting bar 19 is provided with a shaft 22 which is held or supported by the bearing 20. At its other end, the break-up or upsetting bar 19 contains a circularly cylindrical roll 23 which is inserted into the bearing 21. A cover plate 24 prevents the break-up or upsetting bar 19 from displacement in its axial direction. The diameter of the bearing 20 is greater than the thickness or diameter of shaft 22. The diameter of the bearing 21 is greater than the thickness or diameter of the roll 23. Therefore, the break-up or upsetting bar 19, which, as already explained hereinbefore, is arranged substantially horizontally in the interior of the container 16, has free play on all sides and is mounted in a freely rotatable manner by means of the bearings 20 and 21. The illustrated construction is intended to provide ready assembly and disassembly of the break-up or upsetting bar 19 and the cover plate 24 can be readily removed during such operations.

The lower or bottom portion 25 of the container 16 contains at least one floor or bottom surface 25a which is arranged between and at right angles to the longitudinal sides 18 of the container 16. In the illustrated embodiment one floor or bottom surface 25a extends at a downward inclination from its associated broad side 17, which is shown on the left in FIG. 1, towards an exit or discharge opening 29. A jacket member 26 covers at least part of the circumferential surface 12a of the drum 12 and extends from the floor or bottom surface 25a such that an edge portion 27 is formed by the floor or bottom surface 25a and the jacket member 26 at the end of the bottom surface 25a which is remote from the associated broad side 17 of the container 16. The edge portion 27 of the floor or bottom surface 25a conjointly with a lower or bottom edge 28 of the opposite broad side 17, which is shown on the right in FIG. 1, defines the exit or discharge opening 29.

The initially mentioned drum 12 constitutes a member of a preferred construction of removal means for bobbin tubes 12 from the container 16. The removal means or the drum 12 are operatively associated with and substantially cover the exit or discharge opening 29. The drum 12 defines the circumferential surface 12a over which there are distributed the pockets 13 which receive and transport away individual ones of the bobbin tubes 14 which have passed through the exit or discharge opening 29. The rotational axis 11 and the pockets 13 of the drum 12 extend substantially parallel to the broad sides 17 of the container 16.

During operation of the inventive apparatus, the drum 12 rotates in a rotational direction which is indicated by the arrow 15. When an empty pocket 13 moves past the exit or discharge opening 29 between the edge portion 27 and the lower or bottom edge 28 which are associated with the broad sides 17 of the container 16, a bobbin tube 14 which has passed through the exit or discharge opening 29, drops into such empty pocket 13 and is then carried along or transported away by the rotating drum 12. After such bobbin tube 14 has been moved past the lower or bottom edge 28 of the broad side 17 which is located opposite to the floor or bottom surface 25a and which is shown on the right in FIG. 1, the bobbin tube 14 is transported further and away from the drum 12 by conventional and therefore not particularly illustrated transport means to a further station at which the bobbin tube 14 is put to further use.

As already mentioned initially, it is known that jamming of the bobbin tubes 14 can arise in such a manner that the bobbin tubes 14 form so-called "bridges". The bobbin tubes 14 then assume a disposition in which they come into mutual engagement between the floor or bottom surface 25a and the broad side 17 which is opposite thereto and which is shown on the right in FIG. 1, in such a manner that the bobbin tubes 14 prevent each other from further downward displacement. Under these conditions, no further bobbin tubes 14 can pass through the exit or discharge opening 29 into the pockets 13 in the drum 12, although there are possibly still a great number of bobbin tubes 14 contained in the container 16.

In order to avoid such bridge formation, there is provided the break-up or upsetting bar 19 which constitutes a bobbin tube jam break-up mechanism. Such break-up or upsetting bar 19 is maintained in motion by the moving bobbin tubes 14 and which transmits its movements particularly to the bobbin tubes 14 which are located above such break-up or upsetting bar 19. This is probably primarily due to the fact that, contrary to the bobbin tubes 14, the break-up or upsetting bar 19 cannot perform unlimited downward movements because the break-up or upsetting bar 19 is retained by the bearings 20 and 21. If no break-up or upsetting bar 19 would be present, it could happen that the bobbin tubes 14 move downwardly as a relatively uniform group between the broad sides 17. Thereafter, the bobbin tubes 14 are compressed by the floor or bottom surface 25a which compression is the cause of the aforementioned undesirable bridge formation. It is probably justified to assume that the break-up or upsetting bar 19 blocks such relatively undisturbed bobbin tube group descent. The descending bobbin tubes 14, in fact, strike against the break-up or upsetting bar 19 and thereby keep the same in continuous motion.

Clearly a break-up or upsetting bar 19 with a polygonal cross-section has a greater tendency to be in such continuous motion in comparison to a break-up or upsetting bar of round cross-section. In accordance with FIG. 1, the break-up or upsetting bar 19 has an approximately square cross-section. In a slightly modified embodiment, the cross-section may have a triangular or any other suitable multi-angular shape. The break-up or upsetting bar 19 can also constitute a hollow break-up or upsetting bar.

An advantageous location for the break-up or upsetting bar 19 has proven to be situated substantially above a predetermined central region 29a of the exit or discharge opening 29 which extends between the edge portion 27 of the floor or bottom surface 25a and the lower or bottom edge 28 of the aforementioned broad side 17 of the container 16. Furthermore, the spacing 31 of the break-up or upsetting bar 19 from the circumferential surface 12a of the drum 12 preferably assumes a value between a minimum of 1 and a maximum of 3 tube diameters of the bobbin tubes 14. The circumferential surface 12a of the drum 12 effectively defines a separation zone 30 for separating individual ones of the bobbin tubes 14 from the entirety or remaining ones of the bobbin tubes which are contained in the container 16.

For certain constructions of the apparatus according to the invention it can be recommendable to provide at least one further break-up or upsetting bar. The choice between the various possibilities for arranging such multiple break-up or upsetting bars will be made in accordance with the prevailing circumstances.

Metallic and plastic materials are primarily considered as manufacturing materials from which the break-up or upsetting bars can be made. The sliding or friction characteristics of the break-up or upsetting bar 19 relative to the bobbin tubes 14 must be taken into account when selecting the manufacturing material for the break-up or upsetting bar 19.

While there are shown and described present preferred embodiments of the invention, it is to be distinctly understood that the invention is not limited thereto, but may be otherwise variously embodied and practiced within the scope of the following claims.

Accordingly,

What I claim is:

1. An apparatus for removing individual textile bobbin tubes having a predetermined thickness and a predetermined tube diameter from a reservoir which contains such bobbin tubes in a mutually contacting relationship, and operatively associated with a textile machine, especially a spinning or twisting machine, said apparatus comprising:

a container constituting said reservoir and equipped with a discharge opening;

said container possessing at least two broad sides, two opposite longitudinal sides connected to said at least two broad sides, and a bottom portion;

said bottom portion of said container containing at least one bottom surface which extends intermediate said two opposite longitudinal sides of said container;

said at least one bottom surface extending at an inclination towards said discharge opening of said container;

said at least one bottom surface narrowing said container towards said discharge opening of said container;

a break-up bar;

said break-up bar extending through the interior of said container;

means for mounting said break-up bar in said two opposite longitudinal sides of said container, with play on all sides and in a freely rotatable manner;

said break-up bar being arranged in a predetermined region above said discharge opening of said container;

said break-up bar having a predetermined thickness which is approximately of the same order of magnitude as said predetermined thickness of said bobbin tubes;

removal means operatively associated with said discharge opening of said container; and said removal means receiving and transporting away individual ones of said bobbin tubes which have passed through said discharge opening of said container.

2. The apparatus as defined in claim 1, wherein:
said break-up bar is located approximately above a central region defined by said discharge opening of said container.

3. The apparatus as defined in claim 1, further including:
a separation zone defined by said removal means and in which said individual ones of said bobbin tubes are separated from remaining ones of said bobbin tubes contained in said container;
said break-up bar being located at a predetermined spacing from said separation zone; and
said predetermined spacing of said break-up bar from said separation zone being in the range of approximately 1 to 3 times said predetermined tube diameter of said bobbin tube.

4. The apparatus as defined in claim 1, wherein:
said break-up bar has a polygonal cross-section.

5. The apparatus as defined in claim 4, wherein:
said break-up bar has a quadrangular cross-section.

6. The apparatus as defined in claim 5, wherein:
said break-up bar has a substantially square cross-section.

7. The apparatus as defined in claim 1, wherein:
said break-up bar constitutes a hollow break-up bar.

8. The apparatus as defined in claim 1, further including:
at least one further break-up bar provided in addition to said break-up bar in said predetermined region above said discharge opening of said container.

9. The apparatus as defined in claim 1, wherein:
said at least one bottom surface of said bottom portion of said container extends substantially perpendicular to said two opposite longitudinal sides of said container.

10. The apparatus as defined in claim 1, wherein:
said break-up bar extends in a substantially horizontal direction.

11. The apparatus as defined in claim 1, wherein:
said at least two broad sides of said container constitute only two broad sides;
said container possessing a substantially rectangular cross-section; and
said at least one bottom surface of said bottom portion of said container extending from one of said two broad sides at a downward inclination towards said discharge opening of said container.

12. The apparatus as defined in claim 11, wherein:
said at least one bottom surface defines at least one edge portion which is remote from the broad side from which said at least one bottom surface extends;
an other one of said two broad sides is located opposite said at least one bottom surface and defines a bottom edge; and
said at least one edge portion of said at least one bottom surface and said bottom edge of said other broad side opposite said at least one bottom surface, conjointly defining said discharge opening of said container.

13. The apparatus as defined in claim 1, wherein:
said removal means contain a drum which is rotatable about a predetermined axis;
drive means for rotating said drum about said predetermined axis;
said drum defining a circumferential surface and possessing pockets distributed over said circumferential surface for receiving said individual ones of said bobbin tubes which have passed through said discharge opening of said container;
said axis about which said drum is rotatable and said pockets in said circumferential surface of said drum extending substantially parallel to said at least two broad sides of said container; and
said circumferential surface of said drum substantially covering said discharge opening of said container.

14. The apparatus as defined in claim 13, wherein:
said circumferential surface of said drum defines a separation zone in which said individual ones of said bobbin tubes are separated from remaining ones of said bobbin tubes contained in said container;
said break-up bar being located at a predetermined spacing from said separation zone; and
said predetermined spacing of said break-up bar from said separation zone being in the range of approximately 1 to 3 times said predetermined tube diameter of said bobbin tube.

15. The apparatus as defined in claim 1, wherein:
said break-up bar extends substantially parallel to said at least two broad sides of said container.

16. An apparatus for removing individual textile bobbin tubes having a predetermined thickness and a predetermined tube diameter from a reservoir which contains such bobbin tubes in a mutually contacting relationship, and operatively associated with a textile machine, especially a spinning or twisting machine, said apparatus comprising:
a container constituting said reservoir and equipped with a discharge opening;
said container possessing at least two broad sides, two opposite longitudinal sides connected to said at least two broad sides, and a bottom portion;
said bottom portion of said container containing at least one bottom surface which extends intermediate said two opposite longitudinal sides of said container;
said at least one bottom surface extending at an inclination towards said discharge opening of said container;
said at least one bottom surface narrowing said container towards said discharge opening of said container;
a break-up bar;
said break-up bar extending through the interior of said container;
means for mounting said break-up bar in said two opposite longitudinal sides of said container, with play on all sides and in a freely rotatable manner;
said break-up bar being arranged in a predetermined region above said discharge opening of said container;
removal means operatively associated with said discharge opening of said container; and
said removal means receiving and transporting away individual ones of said bobbin tubes which have passed through said discharge opening of said container.

* * * * *